United States Patent [19]
Pirson et al.

[11] 4,186,104
[45] Jan. 29, 1980

[54] ANTIFOAM COMPOSITIONS

[75] Inventors: Ewald Pirson, Burghausen; Jakob Schmidlkofer, Mehring-Od, both of Fed. Rep. of Germany

[73] Assignee: Wacker-Chemie GmbH, Munich, Fed. Rep. of Germany

[21] Appl. No.: 898,006

[22] Filed: Apr. 20, 1978

[30] Foreign Application Priority Data

May 6, 1977 [DE] Fed. Rep. of Germany ....... 2720512

[51] Int. Cl.$^2$ .............................................. B01D 19/04
[52] U.S. Cl. ..................................... 252/358; 252/321
[58] Field of Search ................................ 252/358, 321

[56] References Cited

U.S. PATENT DOCUMENTS

| 3,560,401 | 2/1971 | O'Hara et al. .................... 252/321 X |
| 3,993,606 | 11/1976 | von Bonin et al. .............. 521/128 X |

Primary Examiner—Benjamin R. Padgett
Assistant Examiner—E. Suzanne Parr

[57] ABSTRACT

Antifoam compositions containing organopolysiloxanes having antifoaming properties and a solid material finely dispersed in said organopolysiloxanes in which at least a portion of the solid material is a product obtained from the reaction of an isocyanate and an organic compound having at least one hydrogen atom capable of reacting with the N=C=O group.

5 Claims, No Drawings

ANTIFOAM COMPOSITIONS

The present invention relates to antifoam compositions and more particularly to antiform compositions containing organopolysiloxanes and a solid material obtained from the reaction of an isocyanate and an organic compound containing at least one hydrogen atom capable of reacting with the N=C=O group, dispersed in said organopolysiloxanes.

BACKGROUND OF THE INVENTION

It was known heretofore that antifoam compositions comprising organopolysiloxanes and finely divided solids which are dispersed in said organopolysiloxanes could be added to aqueous containing compositions to control or at least reduce the formation of foam. British Pat. No. 1,228,799 discloses aqueous dispersions containing organopolysiloxanes and having an inorganic filler, such as silicon dioxide having a particle size below about 25 microns, dispersed therein. In contrast to the antifoam compositions known heretofore, the compositions of this invention have certain advantages. For example, dispersions of these antifoam compositions are more effective in an alkali medium and their effectiveness lasts for a longer period of time. Also, dispersions of this invention have a longer shelf-life, have better thermal stability and are more stable to mechanical stresses such as shear stresses.

Therefore it is an object of this invention to provide antifoam compositions having improved thermal and shear stability. Another object of this invention is to provide antifoam compositions which are more effective in an alkali medium. Still another object of this invention is to provide antifoam compositions containing organopolysiloxanes and a solid material which is finely dispersed therein. A further object of this invention is to provide antifoam compositions containing organopolysiloxanes and a finely dispersed material which is a solid at the temperature at which the antifoam compositions are used.

SUMMARY OF THE INVENTION

The foregoing objects and others which will become apparent from the following description are accomplished in accordance with this invention, generally speaking, by providing antifoam compositions containing organopolysiloxanes having antifoam properties and a solid material dispersed therein, in which the solid material is a solid at the temperature at which the antifoam compositions are used and is obtained from the reaction of an isocyanate and an organic compound having at least one hydrogen atom capable of reacting with the N=C=O group.

DETAILED DESCRIPTION OF THE INVENTION

The organopolysiloxanes used in the preparation of the antifoam compositions of this invention are the same organopolysiloxanes which are liquid at room temperature, that have been or could have been used heretofore with finely dispersed solid particles as antifoams. However, due to their availability, it is preferred that the organopolysiloxanes used in the antifoam compositions of this invention have units of the general formula: $R_4Si O_{4-n/2}$, where R represents the same or different hyrocarbon radicals having from 1 to 18 carbon atoms and n is 0, 1, 2 or 3, but on the average is from 1.8 to 2.2.

Because of their availability, it is preferred that at least 50 percent of the R radicals be methyl radicals. Additional examples of hydrocarbon radicals represented by R are the ethyl radical, the 2-phenyl-propyl radical and octadecyl radicals. It is preferred that the hydrocarbon radicals represented by R be free of aliphatic multiple bonds. However, this does not exclude aliphatic unsaturation in the terminal units of linear organopolysiloxanes, such as the vinyldimethylsiloxy group. A portion of the siloxane oxygen atoms in the formula described above can of course be substituted with groups of the general formula OR′, where R′ represents an alkyl radical having from 1 to 5 carbon atoms, including the tert-butyl radical, or an aryl radical, such as the phenyl radical, or hydrogen. Furthermore, a portion of the organopolysiloxanes having units illustrated in the above formula, can be replaced with other organopolysiloxanes having an antifoaming effect, for example those which are modified with polyether, such as ethyleneoxy or propyleneoxy units.

It is preferred that the viscosity of the organopolysiloxanes be from about 50 to 500,000 cSt at 25° C. and more preferably from 100 to 20,000 cSt at 25° C.

Examples of suitable isocyanates which may be used in the preparation of at least a portion of the solid material present in the antifoam compositions of this invention are monovalent and polyvalent isocyanates such as phenylisocyanate, p-ethoxyphenylisocyanate, o-, m- and p-tolylisocyanate, naphthylenediisocyanate, diphenylmethane-4,4′-diisocyanate, tolylenediisocyanate triphenylmethane-4,4′,4″-triisocyanate and polyphenyl-polymethylene-polyisocyanate. Other examples of polyvalent isocyanates are perchlorinated aryl polyisocyanates, polyisocyanates which contain carbodimide groups, the diisocyanates described in U.S. Pat. No. 3,492,330, polyisocyanates, which contain allophanate groups as described e.g. in British Pat. Specification No. 994,890, Belgium Pat. Specification No. 761,626 and published Dutch Pat. Application No. 7,102,524, polyisocyanates which contain isocyanurate groups as described in German Pat. Specification Nos. 1,022,789, 1,222,067 and 1,027,394 and in German Offenlegungsschriften Nos. 1,929,034 and 2,004,048, polyisocyanates which contain urethane groups as described in e.g. in Belgium Pat. Specification 752,261 or in U.S. Pat. No. 3,394,164, polyisocyanates which contain acylated urea groups according to German Pat. Specification No. 1,230,778, polyisocyanates which contain biuret groups as described in British Pat. Specification No. 889,050 and in French Pat. Specification No. 7,017,514, polyisocyanates prepared by telomerization reactions, polyisocyanates which contain ester groups as described e.g. in British Pat. Specification Nos. 965,474 and 1,072,956, in U.S. Pat. No. 3,567,763 and in German Pat. Specification No. 1,231,688 and reaction products of the above mentioned isocyanates with acetals according to German Pat. Specification No. 1,072,385.

It is preferred that the organic compounds containing at least one hydrogen atom which can be reacted with the N=C=O group and which are used in the preparation of at least a portion of the solid material present in the antifoam compositions of this invention have a molecular weight of from about 62 to 10,000.

Preferably the hydrogen atoms which are capable of reacting with the N=C=O group, are present in the hydroxyl groups or amino groups. They may however also be present in thiol groups or carboxyl groups.

Examples of organic compounds which contain hydroxyl groups or amino groups and which, when reacted with a monovalent and/or polyvalent isocyanate, result in products which remain in the solid state at least at the temperature at which the antifoam composition is used, are amines, such as n-butylamine, sec-butylamine, tri-n-butylamine, cyclohexylamine and aniline; alcohols, such as dodecylalcohols, 2-ethylhexanol and ethyleneglycol. Numerous other examples of organic compounds containing hydrogen atoms which can be reacted with the N=C=O group are polyhydroxyl compounds, in particular compounds with two to eight hydroxyl groups, especially those with a molecular weight of 200 to 10,000, preferably 1000 to 6000, e.g. polyesters, polyether, polythioethers, polyacetals, polycarbonates or polyester amides which contain at least two, generally two to eight but preferably two to four hydroxyl groups, of the kind which are known per se for the production of homogeneous or cellular polyurethanes. The above mentioned higher molecular weight polyhydroxyl compounds are frequently used in admixture with up to 95% by weight, preferably up to 50% by weight, based on the total quantity of polyhydroxyl compounds, of low-molecular weight polyols with molecular weights of 62 to 200. Such low-molecular weight polyols include e.g. ethylene glycol, propane-1, 2-diol, propane-1, 3-diol, butane-1, 2-diol, butane-1,4-diol, hexane-1,6-diol, decane-1,10-diol, diethylene glycol, triethylene glycol, tetraethylene glycol, dipropylene tripropylene glycol, glycerol, trimethylolpropane and the like.

Polyesters having hydroxyl groups which may be used include e.g. the reaction products of polyvalent alcohols, preferably divalent with the optional addition of trivalent alcohols and polybasic, preferably dibasic carboxylic acids. The corresponding polycarboxylic acid anhydrides or polycarboxylic acid esters of lower alcohols or mixtures thereof may be used for producing the polyesters instead of the free polycarboxylic acids. The polycarboxylic acids may be aliphatic, cycloaliphatic, aromatic and/or heterocyclic and may be substituted, e.g., with halogen atoms, and/or unsaturated. The following are examples: succinic acid, adipic acid, suberic acid, azelaic acid, sebacic acid, pthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally admixed with monomeric fatty acids, dimethyl terephthalate and bis-glycol terephthalate. Suitable polyhydric alcohols include e.g., ethylene glycol, propylene-1,2- and 1,3-glycol, butylene-1,4- and -2,3-gylcol, hexane-1,6-diol, octane1,8-diol, neopentyl glycol, cyclohexane dimethanol (1,4-bis-hydroxymethyl cyclohexane), 2-methylpropane-1,3-diol, glycerol, trimethylolpropane, hexane-1,2,6-triol, butane-1,2,4-triol, trimethylolethane, pentaerythritol, quinitol, mannitol and sorbitol, methyl glycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones, e.g. ε-caprolactone or hydroxycarboxylic acids, e.g. ω-hydroxycaproic acid may also be used.

Polyethers having at least two, generally two to eight and preferably two or three hydroxyl groups can be prepared e.g. by the polymerization of epoxides such as ethylene oxide, propylene oxide, butylene oxide, tetrahydrofuran, styrene oxide or epichlorohydrin, with themselves, e.g. in the presence of $BF_3$, or by the addition of these epoxides, optionally as mixtures or successively, to starting components which contain reactive hydrogen atoms such as alcohols or amines, e.g. water, ethylene glycol, propylene-1,3- or 1,2-glycol, trimethylolpropane, 4,4'-dihydroxy diphenylpropane, aniline, ammonia, ethanolamine or ethylene diamine. Sucrose polyethers of the kind described e.g. in German Auslegeschriften Nos. 1,176,358 and 1,064,938 may also be used. It is frequently preferred to use polyethers which contain predominately primary OH—groups (up to 90% by weight, based on all the OH—groups in the polyether). Polyethers which are modified with vinyl polymers such as disclosed in U.S. Pat. Nos. 3,383,351, 3,304,273 and German Pat. Specification No. 1,152,536 are also suitable. Polybutadienes which contain OH—groups may also be used.

Among the polythioethers which may be mentioned are the condensation products of thioglycol with itself and/or with other glycols, dicarboxylic acids, formaldehyde, aminocarboxylic acids or amino alcohols. The products are polythio mixed ethers, polythioether esters or polythioether ester amides, depending on the cocomponents.

Polyacetals which may be used are the compounds obtained e.g. from glycols such as diethylene glycol, triethylene glycol, 4,4'-dioxethoxy-diphenyl dimethylmethane, hexanediol and formaldehyde. Polyacetals obtained by polymerizing cyclic acetals may also be used.

Suitable polycarbonates having hydroxyl groups include those known per se, which can be obtained e.g. by reacting diols such as propane-1,3-diol, butane-1,4-diol, and/or hexane-1,6-diol, diethylene glycol, triethylene glycol or tetraethylene glycol with diaryl carbonates such as diphenyl carbonate or phosgene.

The polyester amides and polyamides include e.g. the predominantly linear condensates obtained from polyvalent saturated and unsaturated carboxylic acids or their anhydrides, and polyvalent saturated and unsaturated amino alcohols, diamines, polyamines and their mixtures.

Polyhydroxyl compounds which already contain urethane or urea groups, modified or unmodified natural polyols such as castor oil, carbohydrates and starches may also be used. Addition products of alkylene oxides with phenol formaldehyde resins or with urea farmaldehyde resins may also be used.

The materials which are solid at least at the temperature at which the antifoam compositions are used, are preferably products obtained from the reaction of at least one monovalent or polyvalent isocyanate with at least one organic compound containing at least one hydrogen atom capable of reacting with the N=C=O group and have a particle size which does not exceed about 25 microns.

It is preferred that the antifoam composition of this invention contain from 0.2 to 10 percent by weight and more preferably from 1.5 to 5 percent by weight of the product obtained from the reaction of at least one monovalent or polyvalent isocyanate with at least one organic compound having at least one hydrogen atom capable of reacting with the N=C=O group, based on the total weight of the product and the organopolysiloxane.

In order to make certain that the solid product which should account for at least a portion of the solid material in the antifoam compositions is finely dispersed in the organopolysiloxane, it is preferred that at least one monovalent or polyvalent isocyanate be reacted with at least one organic compound having at least one hydrogen atom capable of reacting with the N=C=O group, in the presence of an organopolysiloxane having antifoam properties.

The order of addition of the isocyanate and the compound during the reaction of the isocyanate with a compound that contains at least one hydrogen atom which is capable of reacting with the N=C=O group is not critical. Thus, the isocyanate may be added to the organopolysiloxane prior to the addition of the compound containing at least one hydrogen atom or the compound containing at least one hydrogen atom may be mixed with the polysiloxane prior to the addition of the isocyanate.

It is preferred that the isocyanate and the compound having at least one hydrogen atom which is capable of reacting with the N=C=O group, be reacted in an equimolar or approximately equimolar ratio. The temperatures and pressures used in this reaction are those which are generally used in such reactions. Generally, the reaction may be conducted from room temperature up to about 180° C. and at 760 Hg (abs.) or approximately 760 mm Hg (abs.).

Substances other than the organopolysiloxanes having antifoam properties, the monovalent or polyvalent isocyanate and the organic compound having at least one hydrogen atom capable of reacting with the N=C=O group, which have been or could have been used heretofore in the preparation of antifoam compositions may be used in the preparation of the antifoam compositions of this invention. Examples of such substances are water-soluble liquids other than organopolysiloxanes, such as mineral oils, vegetable oils, triorganophosphates, carboxylic acid and monovalent alcohol esters, such as for example di-n-butyl sebacate, tridecyl stearate, i-octadecyl stearate, and adipic acid-di-2-ethylhexylester, alcohols having from 5 to 18 carbon atoms and carboxylic acids having from 5 to 18 carbon atoms. Additional examples of substances which may also be used in the preparation of the antifoam compositions of this invention are polypropylene glycols having a molecular weight of between 1,200 and 4,000, ethylene oxide and propylene oxide copolymers which are either partially soluble or insoluble in water, for example those containing 90 mol percent propyleneoxy units and 10 mol percent ethyleneoxy units, as well as inorganic fillers, such as silicon dioxide which has a surface area of at least 50 m$^2$/gm.

Other substances which may be present during the preparation of the antifoam compositions are, for example esters containing carboxylic acids and monovalent alcohols and/or mineral oil. However, these additional substances may also be added to the antifoam compositions after the reaction of the isocyanate and the organic compound having at least one hydrogen atom capable of reacting with the N=C=O group has been completed.

It is preferred but by no means essential that the isocyanate and/or the organic compound containing at least one hydrogen atom capable of reacting with the N=C=O group, be soluble in the organopolysiloxane or in the mixture consisting of organopolysiloxane and other substances.

The antifoam compositions can be used in a concentrated form or they can be used as dispersions in organic solvents. Examples of suitable organic solvents are aliphatic and aromatic hydrocarbons having a boiling point between 50 and 250° C. at 760 mm Hg (abs.), such as benzene, toluene, xylene; ethers such as n-dibutyl ether, ethylene glycol dimethyl ether and mixtures thereof. The antifoam compositions of this invention may be used as oil-in-water type aqueous dispersions. Also these compositions may be used as free flowing powders which are obtained by drying these dispersions, or they may be used as freely flowing powders which are obtained by mixing protective colloids in the dry state with the antifoam compositions.

Examples of dispersing agents which can be employed in the preparation of the antifoam compositions of this invention are protective colloids such as polyvinyl alcohol which may contain up to 40 mol percent of acyl groups, especially acetyl groups, and methylcellulose; emulsifiers such as stearyl polyoxyethylene glycol ether, cetyl polyoxyethylene glycol ether, sorbitol monostearate, trimethylnonyl polyoxyethylene glycol ether and nonylphenol polyoxyethylene glycol ether.

These antifoam compositions may be used to prevent or control the foam in aqueous solutions, such as for example during the evaporation of alkali effluents in the paper industry, during the concentration of latex rubber, in cutting oil emulsions in the metallurgical industry, in dispersion dyes and other applications of synthetic resin dispersions. These compositions may also be used in refining sugar, in petroleum production, textile dyeing, including jet dyeing, effluent control in the preparation of antibiotics and in ore flotation operations.

EXAMPLE 1 a. A mixture containing 380 grams of dimethylpolysiloxane having a viscosity of 2000 cSt at 25° C. which has an Si-bonded hydroxyl group in each of its terminal units, and 5.5 grams of naphthylene diisocyanate is heated to 150° C. with constant agitation in a 1-liter flask. About 5.75 grams of cyclohexylamine are slowly added to the clear solution with constant agitation. After cooling, a white dispersion of solid particles measuring less than 25 micron is present in the organopolysiloxane.

b. About 200 milliliters of an aqueous solution containing 4 percent by weight of sodium lauryl sulfate and 60 milliliters of 1 N NaOH are placed in a 500 milliliter flat-bottomed flask. After shaking the flask 10 times, it is filled with foam. One milliliter of a mixture containing 10 grams of the white dispersion prepared in (a) above and 90 grams of toluene is added to the foam. The foam disappears at once. Every day the flask is shaken 10 times, yet even after 30 days the flask is substantially free of foam.

c. For purposes of comparison, 200 milliliters of the aqueous solution containing 4 percent by weight of sodium lauryl sulfate and 60 milliliters of 1 N NaOH are placed in a 500 milliliter flat-bottomed flask. After shaking the flask 10 times, it is completely filled with foam. One milliliter of the paste described in British Pat. No. 1,228,799, Example 2(a) and 9 grams of toluene are added to the foam. The foam collapses within a few seconds. However, when the shaking procedure is repeated after two days, a substantial amount of foam is formed.

EXAMPLE 2

With constant agitation, a mixture consisting of 400 grams of a copolymer containing 50 mol percent of trimethylsiloxane units and 50 mol percent methylsiloxane units having a viscosity of 400 cSt at 25° C. and 5.5 grams of naphthylene diisocyanate are added to a 1-liter round bottom flask and heated to 150° C. About 40 grams of the dispersion are mixed with 5 grams of a stearyl polyoxyethylene glycol ether and dispersed in 155 milliliters of water with the aid of a high-speed mixer. When the test described in Example 1 (b) is repeated, the dispersion obtained exhibits outstanding antifoam properties.

EXAMPLE 3

A mixture consisting of 400 grams of isopropyl myristate, 40 grams of a dimethylpolysiloxane having an Si-bonded hydroxyl group in each of its terminal units and a viscosity of 5000 cSt at 25° C. and 8 grams of naphthylene diisocyanate are added to a 1-liter round bottom flask and heated to 150° C. with constant agitation. About 13 grams of 2-ethylhexanol are gradually added with agitation to the clear solution. After cooling, a white dispersion of solid particles measuring less than 25 microns is present in the organopolysiloxane-myristate mixture. When tested for its antifoam properties in accordance with Example 1 (b), an aqueous dispersion of the mixture exhibits outstanding antifoam properties.

EXAMPLE 4

To a 1-liter flask containing 240 grams of mineral oil having a viscosity of 15 cSt, 160 grams of dimethylpolysiloxane having an Si-bonded hydroxyl group in each of its terminal units and a viscosity of 12,500 cSt at 25° C. and 10 grams of cyclohexylamine, slowly add 8.7 grams of tolylene diisocyanate with agitation. A white dispersion of solid particles with a size of less than 25 microns forms immediately in the organopolysiloxanemineral oil mixture. When tested in accordance with Example 1 (b) an aqueous dispersion of the product exhibits excellent antifoam properties.

EXAMPLE 5

About 5 grams of cyclohexylamine are slowly added with agitation to a 2-liter flask containing 550 grams of dimethylpolysiloxane having an Si-bonded hydroxyl group in each of its terminal units and a viscosity of 500 cSt at 25° C., 450 grams of a dimethylsiloxane-oxyethylene block copolymer having a viscosity of 2000 cSt at 25° C. in which the polyoxyalkylene blocks are bonded to the dimethylpolysiloxane blocks by SiOC bonding, the polyoxyalkylene blocks represent about 70 percent by weight of the total weight of the polyalkylene blocks and the dimethylpolysiloxane blocks, and 4.35 grmas of tolylene diisocyanate. A white dispersion of solid particles measuring less than 25 microns is immediately obtained in the mixture consisting of dimethylpolysiloxane and dimethylpolysiloxane-oxyethylene block copolymer. When an aqueous dispersion prepared in accordance to Example 2 is tested as described in Example 1(b), it illustrates outstanding antifoam properties.

What is claimed is:

1. An antifoam composition containing an organopolysiloxane having antifoam properties and a solid material which is finely dispersed in said organopolysiloxane, said solid material is present in an amount of from about 0.2 to about 10 percent by weight based on the total weight of the solid material and organopolysiloxane and has a particle size which does not exceed about 25 microns, said solid material is a solid at least at the temperature at which the antifoam composition is used and is obtained from the reaction of an isocyanate and at least one organic compound having a molecular weight of from about 62 to about 10,000 and at least one hydrogen atom capable of reacting with the N=C=O group.

2. The antifoam composition of claim 1, in which the organic compound having at least one hydrogen atom capable of reacting with the N=C=O group is an amine.

3. The antifoam composition of claim 1, in which the organic compound having at least one hydrogen atom capable of reacting with the N=C=O group is an alcohol.

4. The antifoam composition of claim 1, wherein the isocyanate is selected from the group consisting of monovalent and polyvalent isocyanates.

5. The antifoam composition of claim 1, wherein the organic compound has been prepared by reacting the isocyanate with at least one organic compound having at least one hydrogen atom capable of reacting with the N=C=O group, in the presence of an organopolysiloxane having antifoam properties.

* * * * *